(12) United States Patent
von Rotenhan

(10) Patent No.: US 6,547,173 B1
(45) Date of Patent: Apr. 15, 2003

(54) METHOD AND APPARATUS FOR REMOVING THE HUSKS OF OIL-BEARING SEEDS

(75) Inventor: Friedrich-Wilhelm von Rotenhan, Ebelsbach (DE)

(73) Assignee: Dr. Frische GmbH, Alzenau (DE)

( * ) Notice: Subject to any disclaimer, the term of this patent is extended or adjusted under 35 U.S.C. 154(b) by 360 days.

(21) Appl. No.: 09/642,997

(22) Filed: Aug. 21, 2000

(30) Foreign Application Priority Data

Aug. 27, 1999 (EP) .............................................. 99116941

(51) Int. Cl.[7] .............................................. A23N 5/00
(52) U.S. Cl. .................................... 241/260.1; 241/246
(58) Field of Search ............................. 241/260.1, 246, 241/82.2

(56) References Cited

U.S. PATENT DOCUMENTS

| 19,728 | A | * | 3/1858 | Wobfersberger | ......... 241/260.1 |
| 223,689 | A | * | 1/1880 | Adams | ..................... 241/260.1 |
| 2,838,794 | A | * | 6/1958 | Munger et al. | ............... 366/81 |
| 3,734,752 | A | * | 5/1973 | Headley | ...................... 426/481 |
| 4,062,979 | A | * | 12/1977 | Haak | ........................... 426/44 |
| 4,083,836 | A | * | 4/1978 | Anjou et al. | ................. 530/377 |
| 4,225,091 | A | * | 9/1980 | Steier | ......................... 241/24.1 |
| 4,231,529 | A | | 11/1980 | Peck et al. | ..................... 241/189 |
| 4,341,152 | A | | 7/1982 | Solenthaler | .................. 099/609 |
| 4,387,110 | A | * | 6/1983 | Emmi et al. | ................. 426/430 |
| 4,694,993 | A | * | 9/1987 | Endo et al. | .............. 241/46.11 |
| 4,847,106 | A | * | 7/1989 | Pike et al. | ................... 426/629 |
| 5,597,125 | A | * | 1/1997 | Bouldin | ...................... 241/136 |
| 5,673,861 | A | * | 10/1997 | Miller | ......................... 241/69 |

FOREIGN PATENT DOCUMENTS

| DE | 2916729 A | 9/1980 | ............. B02B/3/00 |
| DE | 3219421 A | 1/1983 | ............. B02B/5/02 |
| DE | 3415719 A | 8/1984 | .......... A23N/15/10 |
| DE | 3544387 A | 6/1987 | .......... A23N/15/10 |
| EP | 0277555 A | 7/1987 | ............. B07B/9/00 |
| GB | 1203284 A | 8/1970 | ............. A23N/5/04 |

* cited by examiner

*Primary Examiner*—William Hong
(74) *Attorney, Agent, or Firm*—Quarles & Brady LLP

(57) ABSTRACT

A method and apparatus for removing the hulls of oil-bearing seeds, in particular sunflower seeds, in which a quantity of oil-bearing seeds are filled in a container (3). The seeds are agitated under pressure build-up within the container (3) by means of an agitating means (110, 120) and are pressed and rubbed against each other and against fragments of the hulls.

21 Claims, 3 Drawing Sheets

METHOD AND APPARATUS FOR REMOVING THE HUSKS OF OIL-BEARING SEEDS

CROSS-REFERENCE TO RELATED APPLICATIONS

This application claims the priority benefit of European patent application EP 99 116 941.8 filed on Aug. 27, 1999.

FIELD OF INVENTION

The invention relates to a method and an apparatus for dehulling oil-bearing seeds, in particular sunflower seeds. This involves separation of the husk or hull(pericarp) from the kernel (embryo) of the seeds (in the case of sunflower seeds it involves separation from the achenes).

BACKGROUND

Usually, the seeds of oil-bearing plants such as sunflower, *Euphorbia lathyris* and coriander are characterized in that the kernel is held together by a seed membrane which in turn is protected by a porous water-absorbing husk (pericarp). If the husks or hulls are not removed before oil extraction, they absorb considerable quantities of oil, at least 7% of their weight, thus reducing oil yield during pressing. The oil absorbed by the husk can subsequently only be recovered and extracted by means of solvents.

For some considerable time, various methods and devices have been used to remove the husks or hulls of e.g. sunflower seeds or other oil-bearing crops, such as soybeans. One frequently applied method consists of considerably accelerating the individual seeds and dehulling them by impact. In this method, the seeds impact at high speed on a solid stationary object so that their hulls or the like burst as a result of the braking force at impact. Thus rotating disks made of metal or hard plastic are used throwing the seeds against a rebound plate where they burst depending on their own hardness and the mechanical forces acting upon them. The resulting hull fragments or the like are removed by exhausters or are separated via shaking sieves.

Furthermore, modified devices for removing hulls or the like from sunflower seeds or soybeans have been proposed. The modified devices also accelerate the seeds or beans, as far as possible individually, and husk or dehull them by impact, (e.g. DE 29 16 729 A1). In conventional beaters, impact and its effect are also used for dehulling. Rubber roller husk or hull removers and devices with two rotating rubber plates have also been used with seeds being rolled under light pressure between said plates, so as to remove the husks or hulls. This requires particularly careful size grading of the seed products before the dehulling process.

Dehulled sunflower seeds for the foodstuffs industry have been produced by hydrothermally treating the seeds in steam so as to break the mechanical adhesion between the seeds and the hulls by subsequent fast drying of the superficially moistened hulls. At the same time the seed membrane is loosened and as far as possible separated from the seed (DE 32 19 421 A1). Soybeans too have been subjected to heating prior to dehulling, so as to separate the hulls from the beans and destroy the anti trypsin in the bean by contact with hot surfaces and a subsequent application of a hot gas stream (DE 35 44 387 A1).

The cited literature also mentions the usual measures for separation of the husks or hulls removed in the dehulling device, by means of separator mechanisms like sifters or corona gravity separators. Combinations using electric separators too, have been used for separating the dehulled product from the husks or hulls.

In each of the above methods and devices, the kernel is often damaged, not only by mechanical forces experienced during impact etc. but in particular also by the fact that the seed membrane which surrounds the kernel is destructed during the dehulling process. This results in the kernel losing oil during the dehulling process already and the kernel in addition coming into direct contact with atmospheric oxygen and humidity which is disadvantageous.

BRIEF SUMMARY OF THE INVENTION

The present invention provides a method and apparatus for dehulling oilbearing seeds, such as sunflower seeds, in which a quantity of bulk material of the oilbearing seeds is filled into a confined space. The bulk material is subjected to agitating movement and pressure build-up within the confined space such that the oilbearing seeds are pressed and rubbed against each other and against separated hull fragments kept in the bulk material. The pressing and rubbing gently removes the hulls from the seeds.

A general objective of the present invention is to provide a method and apparatus which dehulls oil-bearing seeds, in particular sunflower seeds, while being careful with the kernel. This objective is accomplished by pressing and rubbing the seeds together to remove the hulls.

This and still other objects and advantages of the present invention will be apparent from the description which follows. In the detailed description below, preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

DETAILED DESCRIPTION OF THE INVENTION

Figure 2:
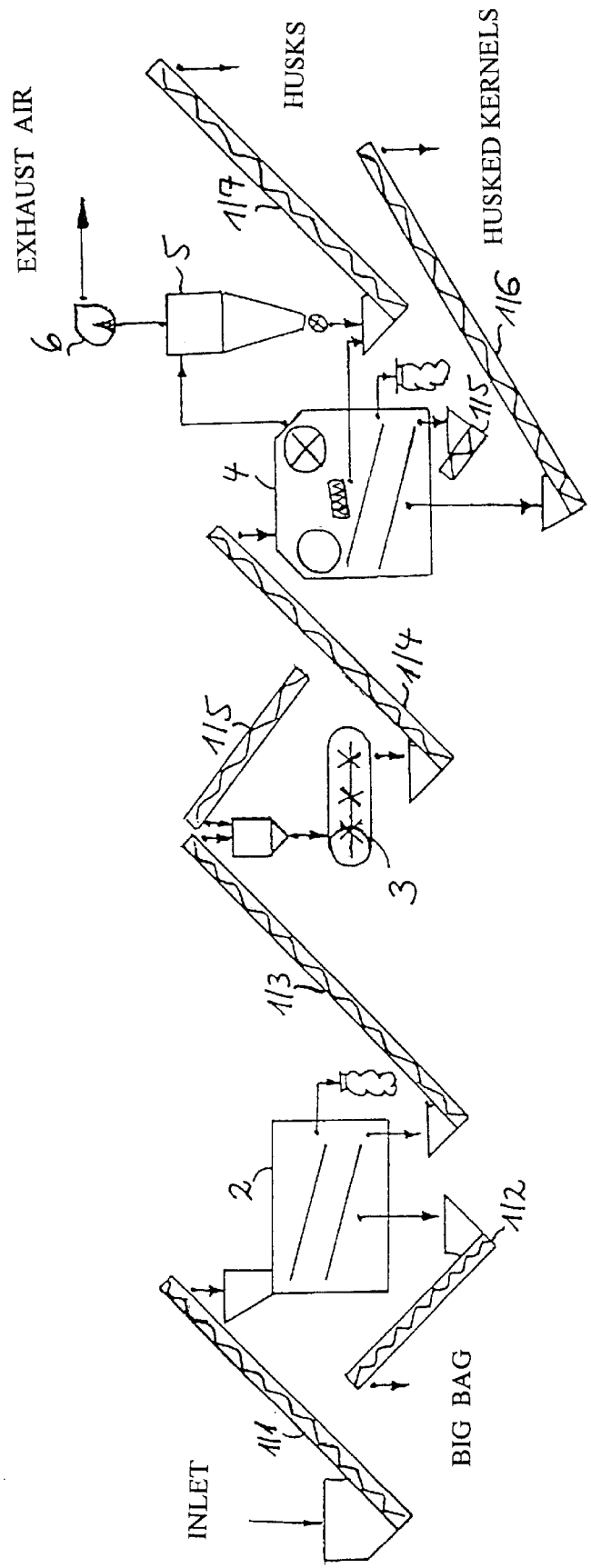
FIG. 2 is a diagrammatic representation of a seed processing plant incorporating the apparatus of FIG. 1.

As shown in FIG. 2, a seed processing plant receives sunflower seeds placed into a tubular screw conveyor 1/1 having a feed funnel and mobile support as well as a fill level monitor. From the tubular screw conveyor 1/1, the seeds are discharged and conveyed to a sizing machine 2 comprising two sieves and three exits. Any coarse material still in the oil-bearing seeds is conveyed to a bag via an upper discharge exit. Via a lower exit, the small seeds are conveyed via a further tubular screw conveyor 1/2 with feed funnel to a large bag or a silo. Preferably, the sorting machine 4 also comprises an outlet for separated waste which is conveyed to a bag.

The sieved-out larger seeds are conveyed via a subsequent tubular screw conveyor 1/3 having a feed funnel into the buffer container of a dehulling apparatus 3 which is explained in more detail below. Below the discharge outlet of the dehulling apparatus, an inlet funnel of a further tubular screw conveyor 1/4 is arranged leading to a further sorting or sizing machine 4 with a feed mechanism, suction-type hull-removal mechanism, two sieves and five discharge exits.

The graded dehulled seeds or husked kernels are discharged via a feed funnel of a further tubular screw conveyor 1/6. Seeds which have not yet been dehulled are taken from a second discharge outlet of the sorting machine 4 and conveyed to the buffer container of the dehulling apparatus 3 via the feed funnel of a tubular screw conveyor 1/5.

Seed fragments with residual hulls are conveyed to a cyclone 5 having a radial fan 6 via a third discharge outlet. The separated hulls fall into the inlet funnel of a tubular screw conveyor 1/7. The hulls from the hull suction mechanism of sorting machine 4 are also conveyed to this inlet funnel. Preferably, the above dehulling apparatus is designed for a continuous throughput of sunflower seeds of 2 t/h.

Preferably, the seeds are deposited onto the conveyor 1/1 in a dried state. Drying can be accomplished using a continuous-flow drier generating a hot airstream of approx. 80° C. with a drier throughput of approximately 500 kg per 1.5 h, such as a Tornado drier made by the company Horstkötter & Co. K G, Beckum, with thermostat-controlled hot air supply. The drier throughput, however, can be lower than that recommended by the manufacturer. Of course, other driers and drying processes, such as vacuum drying, can be used without departing from the scope of the present invention. It is important though, that the entire kernel can be dried without destroying its outer layers as disclosed herein.

Figure 1:
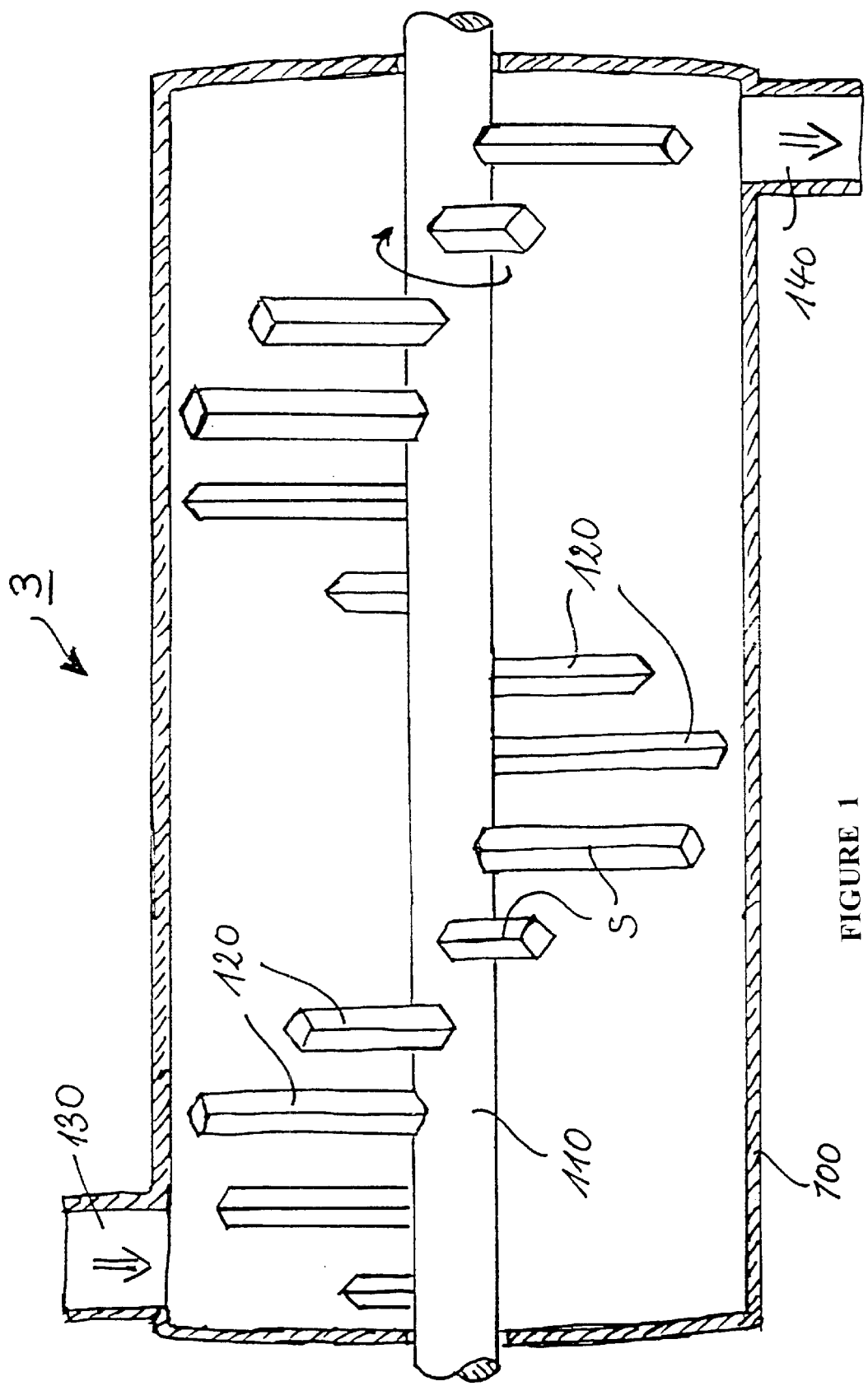
FIG. 1 is a diagrammatic representation of a preferred embodiment of the dehulling apparatus according to the invention.

The dehulling apparatus 3, the basic structure of a preferred embodiment of which is shown in FIG. 1, is a significant and novel component part of the plant shown in FIG. 2, and includes a horizontal drum 100 which rotatably supports (bearings not shown) a central shaft 110 of circular cross section. Agitator bars 120 are mounted to the shaft.

In the embodiment disclosed herein, the stationary steel drum 100 is approximately 1.00 m in length, and has a smooth interior wall. In contrast to other seed processing machines such as e.g. barley bearders, the drum 100 comprises neither stationary beater pins nor wire mats or similar impact or friction mechanisms and equipments.

The shaft can be rotated at more than 2000 rpm. Preferably, processing takes place at high rotational speeds of the shaft and resulting high peripheral speeds at the radially outer end of the agitator mechanism. In a first experimental apparatus, an outer peripheral speed of the tips of the agitator bars exceeding 15 m/s was reached at a rotational speed of 1000 rpm. At lower speeds, dehulling is also possible but at the expense of the material throughput and of the time required. Preferably, the processing takes place at shaft rotational speeds between approximately 1500 rpm to 2500 rpm, and most preferably at approximately 2000 rpm. At the higher rotational speeds, significantly higher peripheral speeds at the outer tip of the agitator bars are achieved. Apart from the fact that agitating at high speeds requires an accordingly more expensive construction, the total heat build-up in the bulk material is the limiting factor both in the agitation process and in the pressure build-up process described below.

The edged agitator bars 120 are used as agitating elements on the rotary shaft of the agitator. The steel agitator bars 120 are fixed to the shaft 110 by lock nuts, and are attached to the shaft such that their impact edge points in the direction of the rotating agitator movement. Preferably, each bar has a square cross-section to provide four longitudinal edges.

The edge S being aligned in the direction of rotation is the impact edge. Although, bars having a rectangular or square cross section and adjusted to the same angular position are preferred, any bar having an edge in respect of their longitudinal axis, such a bar having a triangular cross-section, can be used without departing from the scope of the present invention.

By aligning the bars to have an impact edge, the bulk material is not hit by a plane surface aligned perpendicularly to the direction of rotation, but instead by this edge. On both sides of the edge, the seeds strike over or sweep along the receding surfaces of the agitator bars adjoining the edge without being crushed. The receding surfaces recede at an oblique angle to the direction of rotation of the bars to avoid crushing the seeds on said bar surfaces. With this arrangement, a plurality of high-oleic sunflower seeds can be dehulled efficiently and gently.

With increasing hardness of the hulls of the seeds, especially in case of high-oleic sunflower seeds, the impact edge is preferably rotated. The rotation is such that a pointer pointing from the longitudinal axis of the bar to its impact edge is no longer rectangularily adjusted relative to the longitudinal axis but is angularity displaced to an angle of less than 90°. Also in this case, the impact edge usually still points in the direction of rotation of the bars such that the seeds are not exclusively hit by a plane bar surface. Preferably, the bars are rotatably adjustable around their longitudinal center axis. Hence, if the impact edge S pointing in the direction of rotation is worn, it can be replaced by an impact edge which is not yet worn.

In the embodiment shown, the interspace between the agitator bars 120 is approximately three to four centimeters at a cross-sectional area of the bars of 2.25 cm$^2$. Preferably, the clearance between the impact bars and the inside of the drum is no more than 2 mm. It is advantageous if the clearance does not exceed half the kernel diameter. However, an interspace of at least 5 cm can be used without departing from the scope of the invention. As a result of the limited clearance and the smooth interior wall of the drum, oil leakage from the kernels and stalling of the rotating parts in the bulk material are avoided.

As is shown in FIG. 2, the center axes of the bars are arranged along a helical line. In this schematic illustration the relative angular displacement or offset of the individual bars on the shaft is 45°. A plurality of angular displacements can be used. Preferably, the angular displacement between the bars is 90° so that each screw thread comprises four bars. In this preferred embodiment altogether five complete screw threads were provided on the shaft. For avoiding imbalance, it is recommended to provide complete screw threads in order to avoid unsymmetrical structures with incomplete e.g. half screw threads.

Figure 3:
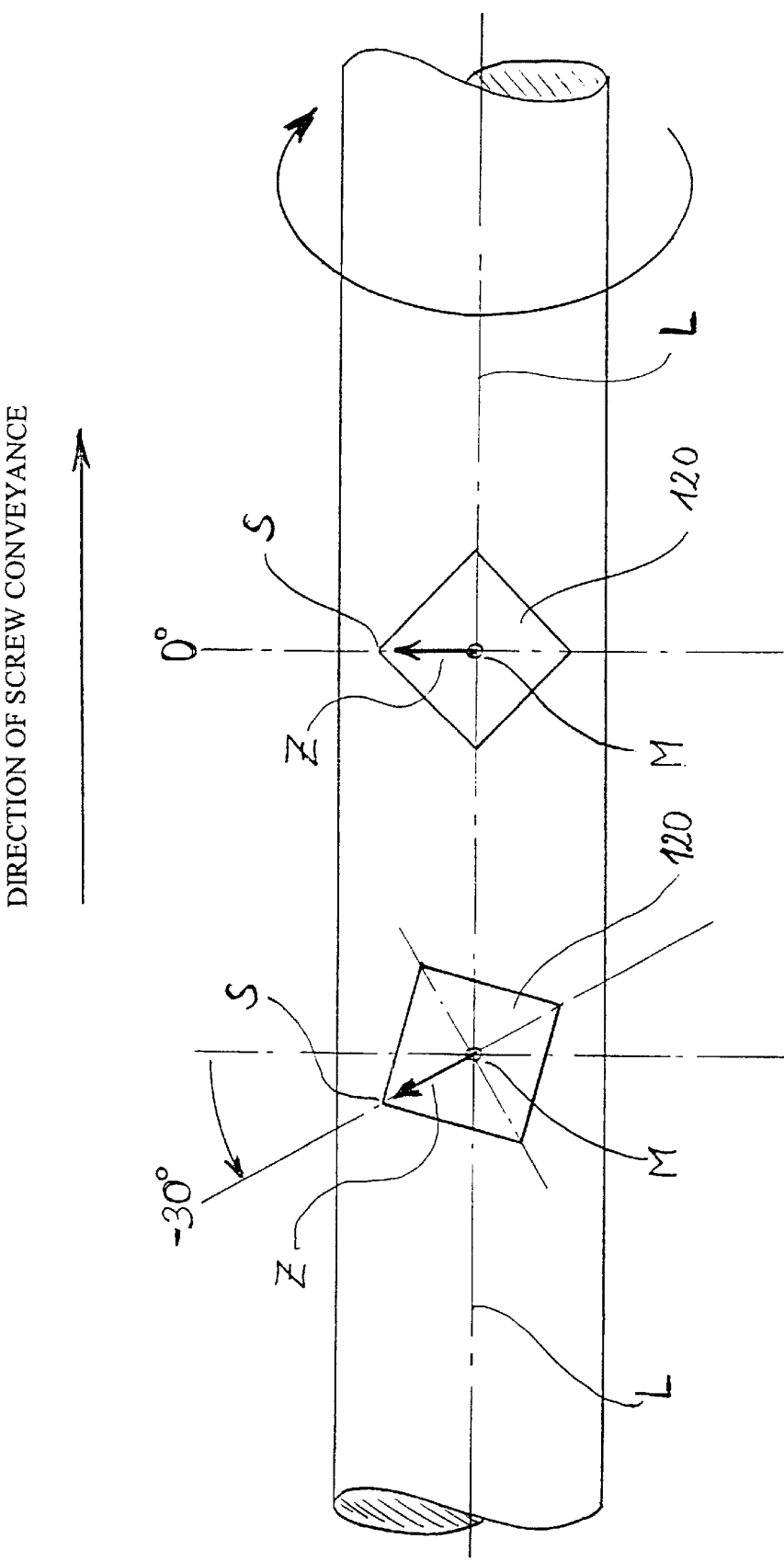
FIG. 3 is a schematic presentation showing the angular displacement of the agitator bars of FIG. 1 according to a further development of the invention.

FIG. 3 is a top view of the shaft 110, and illustrates a special angular adjustment of the agitating bars 120 on the shaft 110. This adjustment is utilized with hard seeds. The bar on the left hand side of FIG. 3 shows this special adjustment whereas the bar on the right side is "normally" adjusted as in FIG. 1. The bar on the right side is adjusted such that its pointer Z pointing from the longitudinal bar axis M to the impact edge S is rectangular relative to the longitudinal axis L of shaft 110 and lies in a radial plane of the shaft. The left bar is adjusted such that the tip of its impact edge S pointing in the rotational direction of the bar is angularity displaced by −30° relative to the radial plane of the shaft and opposite to the conveying direction of the screw. The angle between the pointer Z of this left bar and the longitudinal shaft axis L is 60°.

The non-contiguous screw of FIG. 1 made up of individual spaced bars which are adjusted like the bar on the right hand side of FIG. 3 already causes some backward movement and turbulence movement of the seeds in the interspace between the bars. These movements are amplified by means of an angular adjustment of the bars around their longitudinal axes as shown on the left side of FIG. 3. With this adjustment the downstream seed flow is quasi broken up and is subjected to a backward movement over a short distance. It is also possible to effect such an angular adjustment of the bars in the direction of seed conveyance. It was however observed that this solution is less preferable due to a greater temperature increase of the seed. Preferably, each one of the bars shows the same angular adjustment regarding its longitudinal axis.

The optimum angular adjustment of the bars around their longitudinal axes, on one hand, depends on the hardness and dehullability of the seeds, and on the other hand, depends on the screw pitch and on the angular displacement between the bars on the shaft (e.g. 90° with four bars, 45° with eight bars and 60° with six bars in a screw thread). For finding the optimum value, the bars are preferably rotatably adjustable around their longitudinal axis so that the optimum value can be found for a given screw pitch and angular relative displacement between the bars (number of bars within a screw thread) by a few tests. In such a test, it is sufficient to compare the results of dehulling and to monitor the temperature increase of the seed which should be limited as disclosed below. The combination of angular displacement of 90° between the bars of the screw thread and of an angular adjustment of −30° of the impact edge S of the bars was found to be advantageous for hard high-oleic sunflower seeds.

It is also possible to arrange the individual bars so that they define several helical or screw paths one beside the other along the rotating shaft. In the case of double rows, the bars of one row should be arranged offset along the shaft in relation to the bars of the other row so that there is only one bar in any radial plane.

The seeds, preferably together with already separated husks added thereto, are fed through inlet 130 which can be adjusted via a handwheel (not shown) by means of a slide gate (not shown). With the addition of these husks, the positive effect explained above can be achieved. For high-oleic sunflower seeds, preferable husk addition is approximately 3% by weight in relation to the total weight of the seed supply. The inherent husk constituent of the seeds is approximately 17% by weight, as a result of the addition of husks, the husk constituent is increased to approximately 20% by weight. However, the quantity to be added will depend on the size of the kernels. With an increase in the size of the kernels the space between the kernel or seeds increases, resulting in fewer contacting pressure points. This effect is counteracted by the addition of the husk material.

The outlet 140 is again adjustable by a slide gate, operable by a handwheel. In the apparatus for sunflower seeds shown, the outlet cross section is set so that the inlet volume to the outlet volume has a ratio of 100:90. At a shaft speed of 2100 rpm this value proved favorable in creating suitable pressure build-up in the bulk mass within the drum 100. The use of synchronized control of inlet and outlet cross sections is preferred to ensure that, for example, in the case of varied inlet cross section during the dehulling process, the outlet cross section is synchronously adjusted so that a desired volume ratio is maintained.

The pressure build-up in the drum 100 compresses the seed bulk material. Pressure-build up in the bulk material is preferably achieved by adjusting the bulk material outlet to a smaller value than the bulk material inlet into the dehulling apparatus. Pressure-build up is preferably limited so that neither the direct mechanical pressure interaction between oil-bearing seeds and hulls in the bulk material, nor the heating up as a result of the agitating motion and pressure build-up during the dehulling process, result in oil escape from the oil-bearing seeds.

Since direct measurement of the pressure build-up within the bulk material is more difficult than temperature measurement, preferably, a thermometer is incorporated at the outlet to monitor the temperature of the discharged product. If possible, the material should be warm to the touch, i.e. approx. 33° C. As a rule, temperatures approaching 60° C. are to be avoided. In the case of high-oleic sunflower seeds, the temperature of the bulk material should not exceed 40° C.

If, depending on the particular product to be dehulled, a previously set critical temperature value (e.g. 40° C.) is exceeded, a provided switch-off mechanism can be triggered so that the dehulling apparatus is switched off. In addition there is also the possibility of obtaining a control variable for controlling inlet and outlet cross section, by way of continuous temperature monitoring, and of operating the dehulling apparatus accordingly in a controlled manner on basis of the temperature dependent control value.

Alternatively, when controlling the reduction in bulk material outlet, an expert can easily determine the upper limit for throttling the bulk material throughput without measuring the temperature, by some simple experiments, to determine the point where oil begins to escape with each particular type of oil-bearing seed. The seed and separated hulls then become sticky. In the case of the apparatus described above, the ratio between inlet volume and outlet volume was determined at about 100:90 for high-oleic sunflower seeds.

In operation, the bulk seed material is subjected to agitation accompanied by a conveying movement of the bulk material. According to the embodiment described above, a movement generated in a helical agitator or stirrer is used to convey the bulk material towards a material outlet of the dehulling apparatus. The hull or husk particles removed from the seed during movement of the bulk material provide effective protection to the kernel material against friction damage at varying pressure build-up during the dehulling process. This natural protection by the hull fragments increases towards the bulk material outlet where the quantity of dehulled, and thus no longer protected, kernels becomes larger. To amplify this effect, preferably already separated parts of the hulls or husks are added to the bulk material. This will significantly improve the dehulling result.

With increasing hardness of the hulls of the oil-bearing seeds, the bulk material is preferably subjected to an additional turbulence by subjecting parts of the bulk material to a backward movement. This additional provision is not necessary for a considerable number of seeds and especially also of high-oleic sunflower seeds. These seeds with hulls of normal hardness can be substantially dehulled with only a negligible loss of oil and without any additional turbulent movement. However, extremely hard high-oleic sunflower seeds exist which have a smooth husk, do not show the usual grooving, and have husk halves which show an extremely strong adhesion. For these seeds which practically cannot be dehulled with conventional dehulling methods, the additional turbulent movement of the present invention provides a substantial improvement over the conventional dehulling methods to dehull these extraordinary seeds.

Furthermore, batches loaded according to the size of seeds result in improved dehulling. It has been shown that smaller seeds fill in the voids between larger seeds, thus acting as pressure reducers, impeding pressure transmission among the seeds. This effect can also be counteracted by using a conical drum for the bulk material, with the diameter tapering towards the bulk material outlet. The conical shape (which is however more expensive to produce) improves pressure build-up in the direction of flow of the bulk material. Preferably, seeds for batches are graded to size categories from 1.5 mm upwards (there is hardly any oil in smaller seeds). Grading the seeds mm by mm is preferred to avoid uneven pressure due to different seed effects can be avoided.

Preferably, the oil-bearing seeds and in particular the sunflower seeds are dried prior to the dehulling process. However, seeds whose kernel is only loosely connected, or not connected at all, to the husk or hull can be dehulled without drying or after only superficial drying of their husk. Drying prior to the dehulling process is well-known in principle, as explained above. However, according to the invention, drying is preferably carried out so that the kernel of the oil-bearing seeds, while losing water, shrinks to an extent that the kernel is completely separated from the husk with no adhesion remaining.

In the case of sunflower seeds, drying such that a gap forms between the kernel and the husk is preferred. As a result of drying, the kernel shrinks and becomes hardened and more resistant to breaking. Preferably, the gap is sized such that during communication of the husk, the hardened kernel can fall out freely. This can, for example, be tested by rubbing the dried seeds between the fingers. Preferably, drying is such that the residual moisture of the kernel is below 10%. In the case of sunflower kernels, decreasing the residual moisture to 4% or less proved particularly advantageous.

Advantageously, the desired separation between husk and kernel can be achieved with gentle drying without damaging the seed membrane surrounding the kernel, and without drying out the husk in the drying process to an extent that it becomes brittle. Accordingly, in contrast to conventional drying methods involving oil-bearing seeds, the drying process according to the invention does not cause any superficial drying of the kernels with destruction of the hulls and drying of only the outer kernel layers, but instead drying of the entire kernel including its inner layer, combined with shrinkage and hardening of the kernel which has been strengthened in this way. Thus in conventional dryers, fast throughput and high drying temperatures result in the outside layer of the kernel baking because it releases water vapor more quickly than do the layers below it. Subsequently the baked outer layer of the kernel is split by water vapor emanating from the deeper layers.

Suitably gentle drying according to the present invention is for example achieved in an air-flow dryer using air of a temperature that should not come close to the boiling point of water, and which is preferably set to at least 10° C. below the boiling point of water. In the temperature range below 90° C., preferably around 80° C., water removal from the kernel is very good. If the temperature is significantly lowered, drying is also very gentle but the required reaction time increases greatly.

Advantageously, the dehulling process and apparatus disclosed herein avoids the throwing of individual seeds against plates or walls for impact, or their rolling between disks or rubber rollers. Instead, the dried oil-bearing seeds are exposed to friction by rubbing against each other as a result of providing the seeds in form of a quantity of bulk material and stirring or agitating the bulk material. At the same time, pressure is built up in the container which compresses the bulk material. By agitating the bulk material and by a concurrent slight increase in pressure, pressure is exerted onto the hull. By concurrent friction of the compressed bulk material, the hull crumbles while the kernel remains almost preserved, thus falling out of the hull. During this process, the substance of the stirred bulk material gains a high resistance, increasing the forces acting upon the bulk material as a result of agitating.

In this way it is possible to nearly completely dehull oil-bearing seeds such as coriander seeds and dried sunflower seeds without destroying the seed membranes and the kernels and without experiencing any significant loss of oil. The hulls can subsequently easily be separated from the dehulled kernels, e.g. using a simple wind separator of sifter. By having removed the hulls made of cellulose, the oil yield in a downstream oil press is increased to a very high value. This avoids the considerable oil absorption by the excessively dry hulls experienced with the standard oil extraction method. The oil yield of high-oleic sunflower seeds, dehulled according to the invention, can thus be increased to the highest-possible theoretical value.

The method and apparatus disclosed herein can be used to dehull numerous hard grains, kernels and the like comprising a hull, husk or a shell, and when compared to the conventional dehulling processes, which can require very expensive devices, represents an advance in the art, especially in the case of sunflower seeds and high-oleic sunflower seeds. Apart from oil-bearing seeds, the method according to the invention and the apparatus disclosed herein can be used on other fruits with a shell or hull or the like. For example, amylose peas (Markerbsen) were dehulled according to the invention with very good results.

While there has been shown and described what are at present considered the preferred embodiments of the invention, it will be obvious to those skilled in the art that various changes and modifications can be made therein without departing from the scope of the invention defined by the appended claims.

A stationary agitator container is preferred comprising a stationary drum having a shaft mounted therein. The shaft is provided with radially extending agitating elements spaced from each other along a helical path for conveying the bulk material along the longitudinal axis of the drum towards a bulk material outlet. Thus the spaced preferably rigid elements form one or more threads of a conveying screw.

A horizontally positioned container is preferred. Instead, a vertically positioned agitator container can be used to use alternatively or additionally to the pressure build-up as result of bulk material outlet throttling, a static pressure caused by the vertical column of bulk material held in the container. Furthermore, it is also imaginable to agitate the bulk material batch by batch, instead of continuous throughput of the bulk material.

I claim:

1. An apparatus for dehulling oil-bearing seeds, in particular sunflower seeds, comprising
   a container for receiving a quantity of bulk material of oil-bearing seeds in a confined space;
   agitating means arranged in the container and held in the bulk material for agitating the seeds under pressure build-up within the quantity of bulk-material and for generating friction among the oil-bearing seeds whereby the seeds are pressed and rubbed against each other and against already separated hull fragments held in the quantity of bulk material; and control means for limiting the pressure build-up in the bulk material to maximum values at which the pressure acting on the oil-bearing seeds and the temperature increase resulting in the bulk material do not cause leakage of oil from the kernels.

2. The apparatus according to claim 1, in which the drum comprises controllable inlet and/or outlet cross sections for controlling the inlet/outlet volume ratio of the bulk material.

3. The apparatus according to claim 2, in which means are provided for synchronously controlling the inlet volume of bulk material into the drum and the discharge outlet volume of the bulk material.

4. The apparatus according to claim 1, in which the apparatus is combined with an upstream drying means in which the oil-bearing seeds are dried to such an extent prior to the dehulling process that their kernel, which shrinks as a result of giving off humidity, separates from the surrounding hull.

5. The apparatus according to claim 4, in which the oil-bearing seeds are dried to an extent that, especially in the case of sunflower seeds, a space forms between the kernel and the hull.

6. The apparatus according to claim 4, in which, in said drying means, the seeds are dried gently so that the residual moisture of their kernels is reduced to no more than 10% residual moisture.

7. The apparatus according to claim 4, in which, in the case of sunflower seeds, the seeds are preferably dried in said drying means so that the residual moisture of their kernels is reduced to no more than 4% residual moisture.

8. The apparatus according to claim 1, in which said container includes an inlet through which already separated hull fragments are added to the bulk material.

9. The apparatus according to claim 1, in which control means are provided which monitors the temperature of dehulled material taken from the bulk material and controls the pressure within the bulk material in dependency of the temperature measurements.

10. The apparatus according to claim 1, in which control means are provided for controlling the pressure build-up by reducing an outlet discharge volume of the bulk material in relation to a bulk material inlet volume into said confined space.

11. The apparatus according to claim 1, in which driving means rotatively drive said agitating means, and control means are provided for controlling the pressure build-up by adjusting the rotational speed of the driving means.

12. The apparatus according to claim 11, in which the rotational speed is set at a value at which with peripheral speeds of said agitating means driven by said driving means exceeds 15 m/s.

13. The apparatus according to claim 1, in which said agitating means for agitating the seeds in combination with a concurrent conveying movement of the bulk material from an inlet of the bulk material into said confined space to a discharge outlet of the bulk material.

14. The apparatus according to claim 1, in which, with increasing hardness of the hulls of the oil-bearing seeds, an additional turbulence of the bulk material is caused by said agitating means by subjecting part of the bulk material to a backward movement.

15. The apparatus according to claim 1, in which means are provided to size grade the oil-bearing seeds before introducing them into the dehulling apparatus.

16. An apparatus for dehulling oil-bearing seeds, in particular sunflower seeds, comprising a container for receiving a quantity of bulk material of oil-bearing seeds in a confined space, the container comprising a stationary drum (100) without any equipment on its inside surface; and agitating means arranged in the container and held in the bulk material for agitating the seeds under pressure build-up within the quantity of bulk material and for generating friction among the oil-bearing seeds whereby the seeds are pressed and rubbed against each other and against already separated hull fragments held in the quantity of bulk material, said agitator means comprising a shaft (110) which extends in a longitudinal direction of the drum axis and which carries edged agitator bars (120) attached thereto, wherein the agitator bars (120) are spaced apart along the shaft (110) and are arranged with an angular offset at the shaft such that the bar axes follow a helical path, in which, for avoiding imbalance, complete screw threads are provided in the helical path on the shaft (110).

17. The apparatus according to claim 16, in which each agitator bar comprises an impact edge (S) pointing in the direction of rotation such that a pointer (Z) pointing from the longitudinal axis (M) of the bar to its impact edge (S) is rectangular to the longitudinal axis (L) of the shaft (110).

18. The apparatus according to claim 16, in which each agitator bar comprises an impact edge (S) pointing in the direction of rotation such that the angle between a pointer (Z) pointing from the longitudinal axis (M) of the bar to its impact edge (S), and the longitudinal axis (L) of the shaft (110) is less than 90°.

19. The apparatus according to claim 16, in which the agitator bars (120) are preferably of rectangular cross section.

20. The apparatus according to claim 16, in which the agitator bars (120) are adjustable with regard to an angle of rotation around their longitudinal axes and each one of the agitator bars (120) is adjusted to the same angle.

21. The apparatus according to claim 16, in which the agitator bars (120) extend from the drum axis to the interior wall of the drum leaving little clearance.

* * * * *

UNITED STATES PATENT AND TRADEMARK OFFICE
CERTIFICATE OF CORRECTION

PATENT NO.    : 6,547,173 B1
DATED         : April 15, 2003
INVENTOR(S)   : von Rotenhan It is certified that error appears in the above-identified patent and that said Letters Patent is hereby corrected as shown below:

Column 3,
Lines 23 and 24, "Horstk" and "otter" should be one word -- Horstkotter --

Column 7,
Line 30, "communication" should be -- comminution --

Column 9,
Line 56, insert -- includes means -- between "means" and "for"

Signed and Sealed this

Fourteenth Day of October, 2003

JAMES E. ROGAN
*Director of the United States Patent and Trademark Office*